United States Patent
Levesque

(10) Patent No.: US 10,146,314 B2
(45) Date of Patent: *Dec. 4, 2018

(54) AUTOMATED HAPTIC SETTING GENERATION

(71) Applicant: Immersion Corporation, San Jose, CA (US)

(72) Inventor: Vincent Levesque, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/862,097

(22) Filed: Jan. 4, 2018

(65) Prior Publication Data

US 2018/0129290 A1    May 10, 2018

Related U.S. Application Data

(63) Continuation of application No. 14/969,870, filed on Dec. 15, 2015, now Pat. No. 9,880,627.

(51) Int. Cl.
*G06F 3/01* (2006.01)
*G06F 9/445* (2018.01)
*G06Q 30/02* (2012.01)

(52) U.S. Cl.
CPC ............ *G06F 3/016* (2013.01); *G06F 9/4451* (2013.01); *G06Q 30/02* (2013.01); *G06F 2203/013* (2013.01)

(58) Field of Classification Search
CPC .. G06F 3/016; G06F 2203/013; G06F 9/4451; G06Q 30/02

USPC ......................................................... 345/156
See application file for complete search history.

(56) References Cited

U.S. PATENT DOCUMENTS

| | | | |
|---|---|---|---|
| 8,169,401 B2 | 5/2012 | Hardwick | |
| 9,880,627 B2* | 1/2018 | Levesque | ............... G06F 3/016 |
| 2004/0169483 A1 | 9/2004 | Hardwick | |
| 2006/0288137 A1 | 12/2006 | Grant et al. | |
| 2012/0117094 A1 | 5/2012 | Pratt et al. | |

(Continued)

OTHER PUBLICATIONS

Any information that are not included with this Information Disclosure Statement can be found in US. Appl. No. 14/969,870.

(Continued)

*Primary Examiner* — Stephen G Sherman
(74) *Attorney, Agent, or Firm* — Medler Ferro Woodhouse & Mills PLLC

(57) ABSTRACT

A system and method of generating a set of preferred haptic settings for a user based on haptic settings chosen by other similar users is presented. The method includes maintaining a database of haptic software applications with associated haptic configuration settings. When a user loads a haptic software application such as a computer game or video, a server receives a communication identifying the particular computer game or video and the identity of the user. The server searches the database for other users of the computer game or video where the other users have similar setting preferences as the user. The server calculates a preferred set of configuration settings and sends those settings to the user where a haptic output device produces haptic effects based on the preferred set of configuration settings. A system that generates haptic setting based on similar users is also presented.

20 Claims, 7 Drawing Sheets

(56) References Cited

U.S. PATENT DOCUMENTS

2012/0311135 A1   12/2012  Deluca et al.
2013/0201138 A1    8/2013  Kono et al.
2016/0063828 A1    3/2016  Moussette et al.

OTHER PUBLICATIONS

Office Actions issued in the parent application, U.S. Appl. No. 14/969,870.
Communication Pursuant to Article 94(3) EPC dated Jul. 30, 2018 in corresponding European Patent Application No. 16 180 998.3.

\* cited by examiner

AUTOMATED HAPTIC SETTING GENERATION

CROSS-REFERENCE TO RELATED APPLICATION

The present application is a continuation of U.S. patent application Ser. No. 14/969,870, filed Dec. 15, 2015, the disclosure of which is incorporated by reference herein in its entirety.

FIELD

One embodiment is directed generally to haptic effects. More particularly, an embodiment is directed to the generation of haptic configuration settings in a haptic enabled device.

BACKGROUND INFORMATION

Haptics is a tactile and force feedback technology that takes advantage of a user's sense of touch by applying haptic feedback effects (i.e., "haptic effects"), such as forces, vibrations, and motions, to the user. Devices, such as mobile devices, touchscreen devices, and personal computers, can be configured to generate haptic effects. In general, calls to embedded hardware capable of generating haptic effects (such as actuators) can be programmed within an operating system ("OS") of the device. These calls specify which haptic effect to play. For example, when a user interacts with the device using, for example, a button, touchscreen, lever, joystick, wheel, or some other control, the OS of the device can send a play command through control circuitry to the embedded hardware. The embedded hardware then produces the appropriate haptic effect that is perceived by the user.

Different users, with different haptic enabled applications, prefer different settings. Some, for example, prefer strong haptic effects while others prefer them to be more subtle, or even absent. The default settings for haptic content are typically the same for all users and thus may be acceptable for some of the users, while being unacceptable for others.

SUMMARY

One embodiment of the present invention is a method of generating a set of preferred haptic settings for a user based on haptic settings chosen by other similar users. This method includes maintaining a database of haptic software applications with associated haptic configuration settings. When a user loads a haptic software application, e.g., a computer game or video, the server receives a communication identifying the particular computer game or video and the identity of the user. The server searches the database for other users of the computer game or video where the other users have similar setting preferences as the user. The server calculates a preferred set of configuration settings and sends those settings to the user where the user's haptic output device produces haptic effects based on the preferred set of configuration settings.

DETAILED DESCRIPTION

The software industry incorporates haptic effects to promote their products and provide the user with a more realistic experience. However, preferences for haptic effects vary across users, making it difficult to provide an optimal experience using initial default settings defined in games and videos, or other haptic content. The automatic collection and dissemination of information regarding haptic settings allows for the tailoring of haptic settings based on other users with similar preferences.

Figure 7:
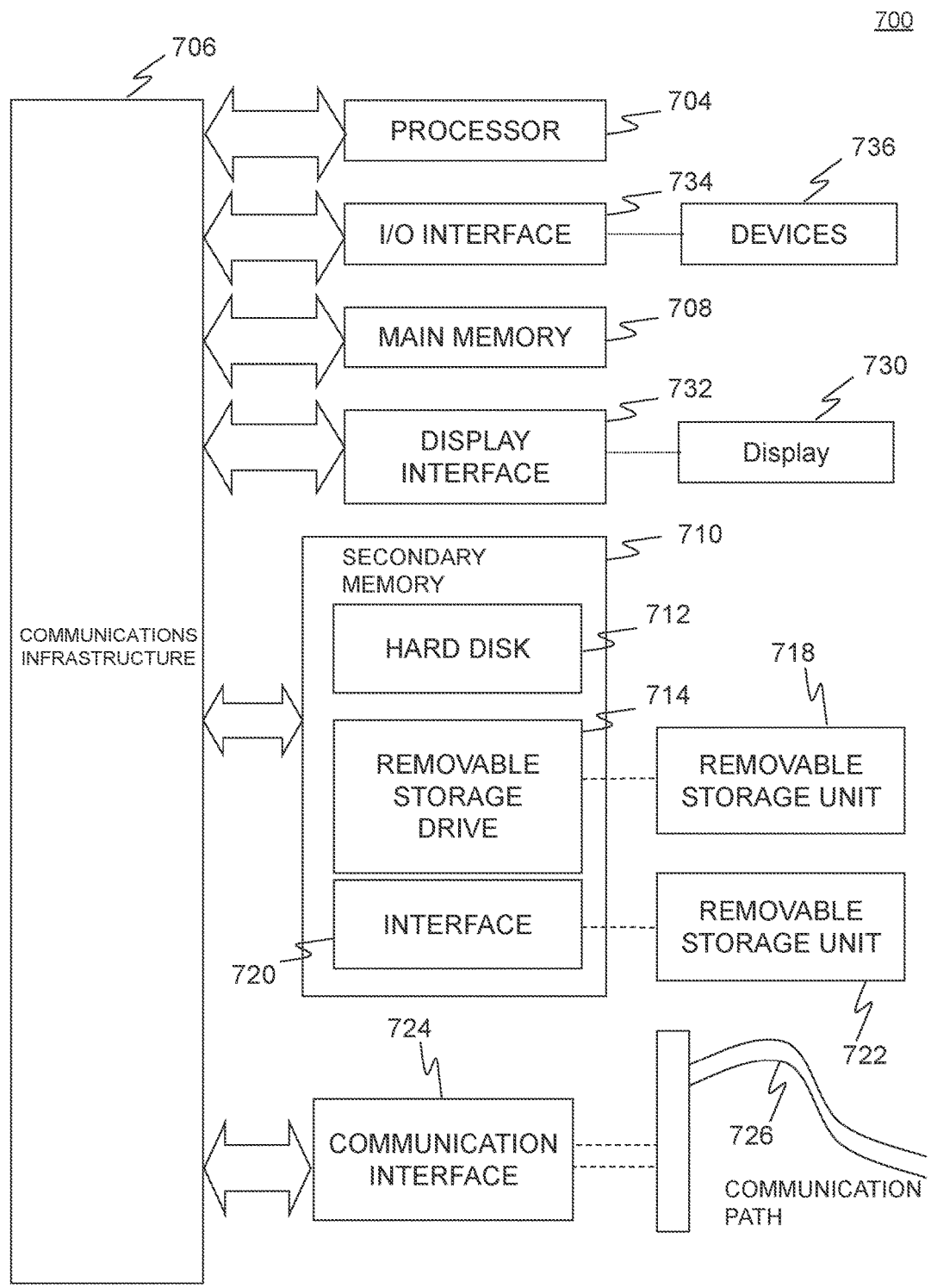
FIG. 7 is a diagram of an example computer system in which embodiments can be implemented.

One embodiment provides for the automatic storage of haptic settings for a user with a haptic-enabled device. The embodiments include maintaining a database that includes a listing of haptic software applications, where each application is associated with a set of haptic configuration settings. It is also possible that portions of the database can be downloaded to a user's local device to allow for an offline modification of the haptic configuration settings. In a similar manner the portion of the database on the local device could be updated periodically when a network connection is available. When a user starts a haptic-enabled application, the haptic configuration settings are uploaded to the server. In another embodiment, whenever the user modifies any of the haptic configuration settings, the modified settings are uploaded to the server. A server is a general term for any type of computer system or computing device and includes, but not limited to, computer system 700 as shown in FIG. 7. A server can be any type of computing device that shares data, e.g., a hand held processing device.

In an embodiment, when a user initiates a haptic-enabled application, an application identifier that defines the application being executed by the user is sent to a server. Given the application identifier the server retrieves all of the haptic settings used by other users for that application. The server then calculates a preferred set of haptic settings, e.g., a mean, median, or a weighted average, and sends the suggested preferred set of haptic settings back to the user.

In an embodiment, when a user initiates a haptic-enabled application, a "first application," an application identifier that defines the application being executed by the user is sent to a server. In addition, a user identifier is also sent to the server that identifies the particular user. The server searches its database to identify other applications, a "second application," used by the particular user. The server then searches the database for other users that have used both the first and second application. The server then calculates a preferred set of haptic settings based on the haptic settings of the first application by the other users and transmits that preferred set of haptic settings to the user for use by a haptic output device to produce a haptic effect.

Rather than triggering the above process to when the user initiates the haptic-enabled application, the haptic settings could be checked every time any haptic-enabled application runs and could periodically suggest changes to the user, or automatically make such changes. For example, if a user changes the haptic strength setting to "LOW" in one game or video, the system could present a dialog to the user stating "Users who have selected low haptic strength in this video have also selected subtle effects in Game X and weak effects in Video Y—Would you like to change these settings?" In this manner the user would not have to manually propagate a change in haptic configuration settings through all of the user's games or videos.

In an embodiment, the system includes a haptic enabled device that includes a processor that executes a data collection client. The system also includes a communication system that allows the haptic enabled device to communicate with a server. The communication system transmits to the server a first application identifier and a first user identifier. In response, the system receives a preferred set of haptic settings for the first application. The generation of the preferred set of haptic settings is accomplished by searching a database for a second application identifier that is associated with the first user identifier that includes a first set of haptic settings. Further, the database is searched to identify a second user identifier that is associated with both the first and second applications. The preferred set of haptic settings is calculated based on the haptic settings associated with the second user and the first application. In another embodiment the system identifies the second user based on that user's history of choosing similar settings as the first user and then determines the preferred set of haptic settings based on the haptic settings chosen by the second user. The preferred set of haptic settings are then used by a haptic output device to produce a preferred haptic effect.

In an embodiment, a processor generates haptic settings. The generation includes maintaining a database that includes a listing of haptic software applications, where each application is associated with a set of haptic configuration settings. When a user starts a haptic-enabled application, a "first application," an application identifier that defines the application being executed by the user is sent to a server. In addition, a user identifier is also sent to the server that identifies the particular user. The server searches its database to identify other applications, a "second application," used by the particular user. The server then searches the database for other users that have used both the first and second application. The server then calculates a preferred set of haptic settings based on the haptic settings of the first application by the other users and transmits that preferred set of haptic settings to the user. In another embodiment other users are identified that have chosen similar settings as the particular user and the preferred set of haptic settings are determined based on the haptic settings chosen by the similar users.

Figure 1:
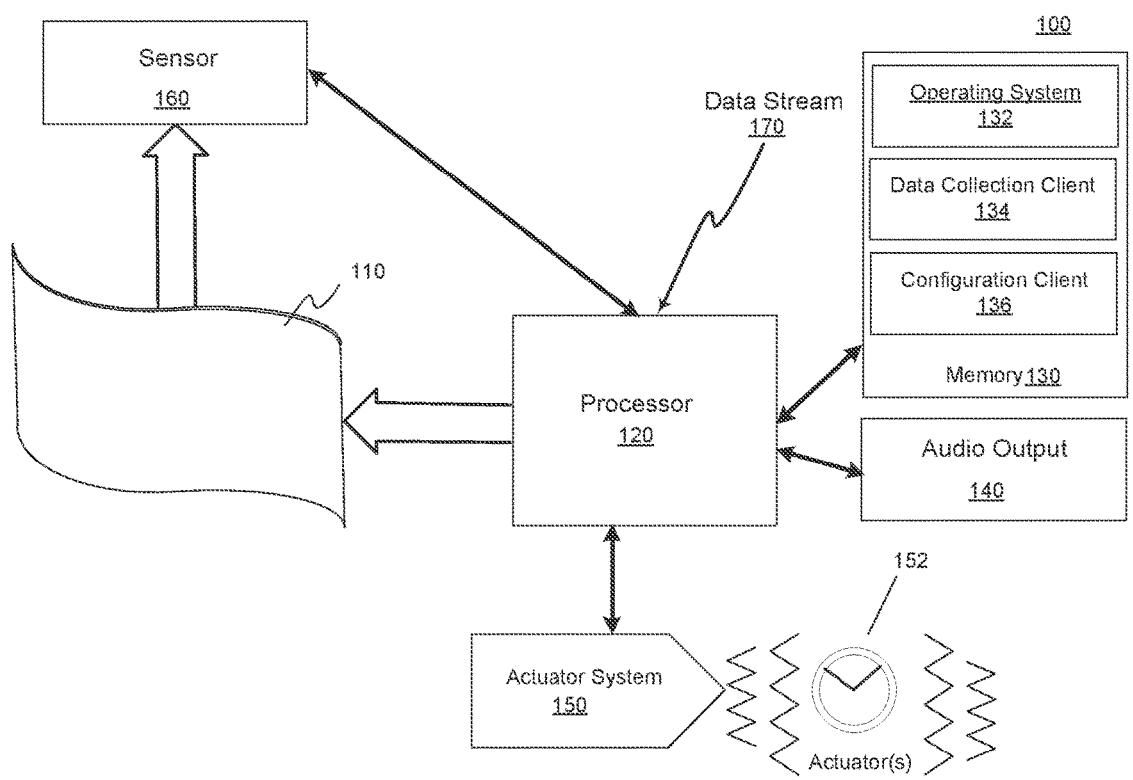
FIG. 1 is a diagram of a haptic-enabled system in accordance with an embodiment of the present invention.

FIG. 1 is a block diagram of a haptic system 100 in accordance with an embodiment of the present invention. System 100 includes a haptic device 110. Haptic device 110 also includes a processor 120, an actuator system 150 including actuator 152, a memory 130 that contains an operating system 132, a data collection client 134, a configuration client 136, an audio output 140 and a sensor 160. Further, system 100 receives content and data via a data stream 170.

Haptic device 110 can also include a display screen that can also be touch sensitive. Therefore, in addition to displaying images, the screen is capable of recognizing touches, such as those provided by a user, and may also recognize any of the position, pressure magnitude, and duration of touches on the surface. The data corresponding to the touches is sent to processor 120, or another processor within system 100, and processor 120 interprets the touches and in response generates haptic effect signals. The touch surface may sense touches using any sensing technology, including capacitive sensing, resistive sensing, surface acoustic wave sensing, pressure sensing, optical sensing, etc. The touch surface may sense multi-touch contacts and may be capable of distinguishing multiple touches and the location of the touches that occur at the same time.

Haptic device 110 contains other components, including for example processor 120, memory 130, actuator system 150, and audio output 140. Haptic device 110 can also include other necessary components that are not shown such as a power source, I/O jacks, microphone, control buttons, camera, etc.

Haptic device 110 includes processor 120 that is coupled to memory 130, which can store an operating system in addition to haptic effects instructions. Memory 130 also stores configuration settings for the haptic effects. Haptic effects instructions are also referred to as a "haptic track" and provide a stream of commands to processor 120 that control actuator system 150 to produce the desired haptic effects. Actuator system 150 is coupled to one or more actuators 152. Processor 120 receives content through data stream 170. The content can include data, instructions, video and/or audio content. Data stream 120 can also include a haptic track of haptic effects instructions that are associated with the audio/video content. The haptic effects can include deformation, vibration, or a combination of both. Further, deformation and vibration could be contained in their own "tracks," resulting in a haptic track that includes a vibration track and a deformation track. In some cases the haptic track also includes time markers that correspond with the audio/video content to ensure synchronization between the playback of the content on a screen and audio output 140, and the execution of haptic effects instructions by processor 120.

Haptic enabled applications can also contain multiple haptic tracks where each track places an emphasis on a different aspect. For example, in a movie trailer there could be multiple tracks where one track would emphasize the action aspect of the video and another track would emphasize the moods or emotions aspect. The same approach can be applied to a media player where different tracks contain different haptic settings that would allow different settings to be adjusted on a per-video basis.

Processor 120 can decide what haptic effects are to be played and the order in which the effects are played based on configuration setting parameters. In general, the configuration setting parameters that define a particular haptic effect include magnitude, frequency and duration. Low level configuration setting parameters such as streaming motor commands could also be used to determine a particular haptic effect. A haptic effect may be considered "dynamic" if it includes some variation of these parameters when the haptic effect is generated or a variation of these parameters based on a user's interaction.

Actuators 152 can include one or multiple actuators where such actuators could include deformation and vibration type actuators, or where a deformation actuator could be used to deform and to vibrate. The actuators can include any type of motor, including without limitation an Eccentric Rotating Mass ("ERM"), a Linear Resonant Actuator vibration motor ("LRA"), a piezoelectric motor, or a solenoid actuator. In addition to or in place of actuator 152, system 100 may include other types of haptic output devices (not shown) that may be non-mechanical or vibrotactile haptics devices such as devices that generate electrostatic friction ("ESF"), ultrasonic surface friction ("USF"), devices that induce acoustic radiation pressure with an ultrasonic haptic transducer, devices that use a haptic substrate and a flexible or deformable surface or shape changing devices and that may be attached to a user's body, devices that provide projected haptic output such as a puff of air using an air jet, devices that provide electrical muscle stimulation, etc. Further, actuators 152 can utilize shape memory alloy ("SMA") wires to force haptic device 110 to bend along one or more axes, e.g., along the corners or to twist. Other technologies such as smart materials, strings pulled by motors, or arrays of moveable pins could also be used for actuation.

Actuator system 150 and actuators 152 produce haptic effects that include various vibrations and shaking effects. Actuator system 150 and actuators 152 are also used to deform the shape of haptic device 110. Such deformation can occur in a single axis, two axes, or in three axes and can produce an extension, twisting or bending of haptic device 110 in one, two, or three dimensions.

Processor 120 may be any type of general purpose processor, or could be a processor specifically designed to provide haptic effects, such as an application-specific integrated circuit ("ASIC"). Processor 120 may be the same processor that operates the entire system 100, or may be a separate processor. Processor 120 fetches haptic effects instructions from memory 130 that direct processor 120 as to which particular haptic effects are to be produced by actuator system 150. Haptic effects instructions can be pre-loaded and resident in memory, or they can be loaded from an integrated port, e.g. Universal Serial Bus ("USB"), or downloaded via data stream 170. Processor 120 can also generate haptic effects instructions based on content received in data stream 170. Data stream 170 could contain the actual haptic effects instructions that would then be stored in memory 130, or data stream 170 would contain audio and/or visual content from which processor 120 would construct haptic effects instructions in real time, or for storage in memory 130 for later playback. System 100, in embodiments that transmit and/or receive data via data stream 170, further include a communication device (not shown), such as a Wi-Fi subsystem or a cellular link.

Memory 130 can be any type of storage device or computer-readable medium, such as random access memory ("RAM") or read-only memory ("ROM") or any other type of computer-readable memory. Memory 130 stores instructions that are executed by processor 120 including operating system 132. Data collection client 134 resides in memory 130 and is responsible for collection of data regarding system 100 with the intent to communicate that data via data stream 170. Configuration client 136 also resides in memory 130 and is responsible for receiving data, such as configuration data. Memory 130 also includes haptic effects instructions (not shown) that are instructions that, when executed by processor 120, generate drive commands for actuator system 150 and actuators 152 that provide haptic effects, as disclosed in more detail below. Memory 130 may also be located internal to processor 120, or any combination of internal and external memory.

Processor 120 outputs the command and control signals to actuator system 150, which includes electronic components and circuitry used to supply actuator 152 with the required electrical current and voltage (e.g., "motor signals") to cause the desired haptic effects. As previously mentioned, system 100 may include more than one actuator 152, and each actuator may include a separate drive circuit (not shown), all coupled to processor 120.

System 100 may include a variety of sensors, such as sensor 160, for sensing interactions with haptic device 110. Sensor 160 can consist of, among others: strain gauge sensors to measure the deformation magnitude during interactions, force sensing resistor ("FSR") sensors to measure the force/stress applied to the haptic device, multi-touch touch sensors to detect the location of single or multiple touch inputs in a touch-enabled display, multi-touch pressure sensors to measure the pressure applied under each touch location, temperature/humidity/atmospheric pressure sensors to capture environmental conditions, an accelerometer/gyroscope/magnetometer to characterize the motion, velocity, acceleration and orientation of the display, a microphone to capture a user's voice command or environmental audio information, and wireless transmitters to receive/transmit information from/to other devices wirelessly. The data corresponding to sensor 160 is sent to processor 120, or another processor within system 100, and processor 120 interprets the sensor data and in response can generate haptic effect signals, feedback through data stream 170, audio responses, and visual images.

In addition to the actuators discussed above, system 100 may include a variety of actuators for providing vibrotactile or kinesthetic feedback including flexible, semi-rigid, or rigid actuators, including Electro Active Polymer ("EAP") actuators, smart fluids actuators, rheological fluidic actuators, Macro-Fiber Composite ("MFC") actuators, Shape Memory Alloy ("SMA") actuators, piezo actuators, and Micro-Electro-Mechanical System ("MEMS") actuators.

System 100 may be a handheld device, such a cellular telephone, personal digital assistant ("PDA"), smartphone, computer tablet, gaming console, vehicle based interface, etc., or may be any other type of flexible device that includes a haptic effect system with one or more actuators. The user interface may be a touch sensitive surface, or can be any other type of user interface such as a microphone, camera, etc. In embodiments with more than one actuator, each actuator that has rotational capability may have a different rotational capability in order to create a wide range of haptic effects on the device, for example each actuator can be controlled individually; also some rotational actuators have their axis of rotation at an angle to the axis of rotation of other rotational actuators. Likewise, in embodiments with multiple actuators with other capabilities, each actuator can be controlled individually to exhibit a wide range of haptic effects on the device. For example, multiple actuators could be used to independently deform each of the four corners of haptic device 110, each at a different rate and degree of deformation.

Figure 2:
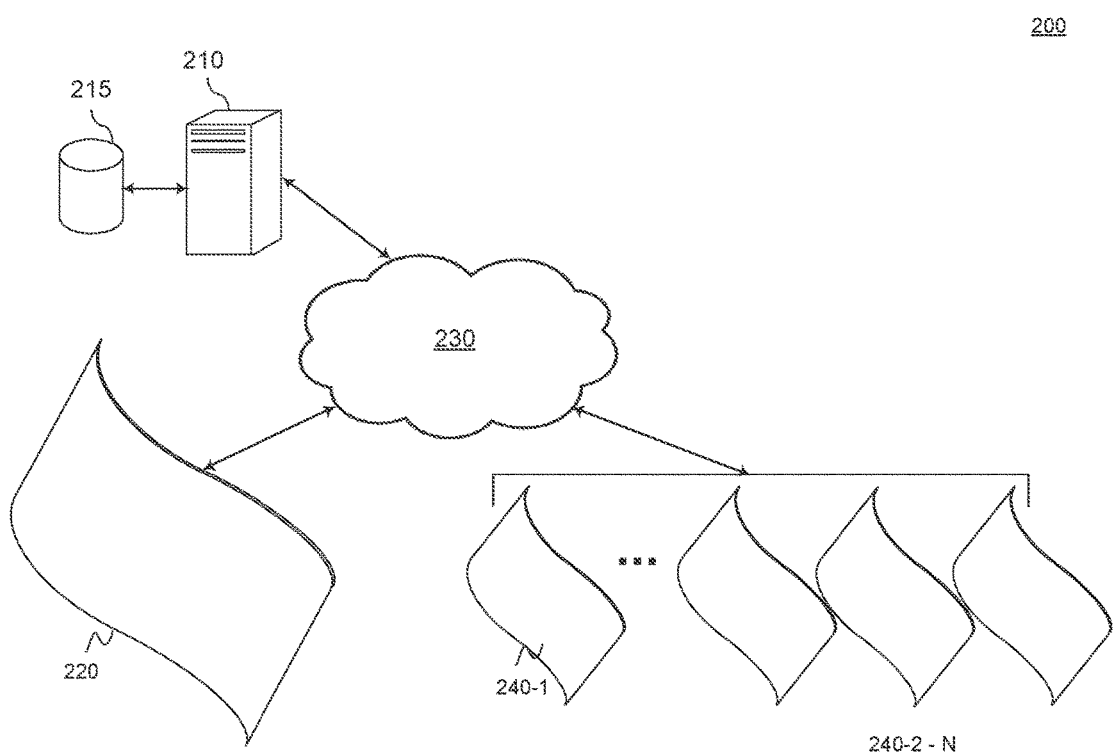
FIG. 2 illustrates multiple haptic enabled devices that communicate with a server to transfer haptic configuration information, according to an embodiment.

FIG. 2 is an illustration of haptic enabled device communication system 200. System 200 includes a server 210 with a storage system 215, a haptic enabled device 220, communication cloud system 230, and multiple other haptic enabled devices 240 (labeled 240-1 through 240-N).

Communication cloud system 230 can include one or more networks, such as a local area network ("LAN"), a wide area network ("WAN"), the Internet or a combination thereof. The connections of the components to communication cloud 230 can be wired, wireless, or a combination of wired and wireless connections. Server 210 and storage 215 can be any type computer and storage, with the description of possible computer based systems being discussed more fully in FIG. 7.

In an embodiment, as the users of haptic enabled devices 240-1—N execute various haptic enabled applications, e.g., games and videos, on their devices, each user has the option of enabling, disabling or modifying the default haptic settings associated with each haptic enabled application. Resident on each haptic enabled device 240 is a data collection client ("DCC"). DCC is a piece of client software that collects information about the haptic configuration of an application or mobile operating system. Whenever a user first installs an application or makes a change to the haptic settings of the application, the DCC communicates that information to server 210. The transmitted information includes at least an identifier of the application and either the initial default haptic settings, or the changes to the initial default haptic settings. In an embodiment, this information could be provided anonymously with no additional identifying information.

In another embodiment, the DCC also associates the haptic settings of an application to a specific user, or to a specific device. For example, the DCC could communicate a user identifier or a device identifier in addition to descriptive user information including demographics, location, device configuration, operating system, other applications installed, etc. Such information can be transmitted to server 210 once when the DCC is first activated, or when an account is manually created by the user.

The DCC functionality can be implemented at the operating system of the application level. Server 210, for example, could provide a cloud application programming interface ("API") that can be used by the mobile operating system of individual applications to communicate information to and from server 210. Further, a software development kit ("SDK") could also be provided by the operating system or service vendor to integrate the functionality in the software.

In an embodiment, a user could elect not to implement the above functionality and not send any data to server 210. That user, however, could still benefit from information provided by others.

In an embodiment, the DCC software is installed on haptic enabled devices 240 that communicate through communication cloud 230 to server 210 and storage 215. The DCC client software sends haptic configuration setting information to server 210 and storage 215. At the simplest level, this information can be used to determine the most appropriate default haptic configuration for a specific haptic enabled application. For example, the user of haptic device 220 installs a new application where the users of haptic devices 240 have already installed that same application and have made adjustments to the associated haptic configuration settings which have been sent to server 210 and stored in storage 215.

In an embodiment, if a large proportion of users have changed settings of a game or a video to reduce the intensity of haptic effects, future installations of the application, e.g., to haptic device 220 in the above example, can default to the reduced intensity haptic settings.

However, some users may have known biases, e.g., prefer strong haptic effects, and these biases can be taken into account. Further, some users may dislike the default haptic settings of a particular application, but fail to make the effort to modify the settings. Similarly, some users may turn off haptics completely for simplicity even though they would be happier with subtle haptic effects. The change from the default setting could be gradual, using algorithms in control theory to slowly change settings until the target settings are obtained.

In an embodiment, system 200 could learn to make personalized recommendations based on previously expressed preferences. For example, if a user has selected subtle haptic effects in an application, (e.g., "Angry Bird") then the user is likely to choose similar subtle haptic effects in another application (e.g., "Candy Crush"). In another embodiment, system 200 could base the recommendation for a user of a new application (e.g., user on haptic device 220 with Candy Crush) based on other users who have selected the same haptic settings as the new user for the existing application (e.g., user on haptic device 200 and users of haptic devices 240 both with Angry Birds) and base its recommendation on the settings from the other application (e.g., users of haptic devices 240 with Candy Crush).

The process of generating haptic configuration settings can be automated to result in selecting the best possible haptic configuration settings for a user. For example, the first installation of a particular game or video would use the default settings that were determined by the haptic designers of the game. As users make changes to the haptic setting, server 210 automatically gathers information about the preferred setting for new installations using the DCC client as previously discussed. The default settings therefore evolve with time. Server 210 can build profiles based on the settings preferred by specific users. The default settings of a game or video can be customized on the user's profile. Thus, system 200 would communicate to users that "other users who have selected the same settings as you in Angry Birds have used these haptic settings in this game."

For example, Alice is developing a small software game or composing a video and is considering adding haptic feedback. She has been trying to tune the haptic effects but preferences vary across her test users. Some users elect to have numerous effects, while other elect very few, and others do not want any haptic effects. She was about to remove haptics from the application entirely when she found an API that allows the settings to adapt to user preferences. As a result, when a user installs the application, the best settings will be chosen based on what settings the user has selected in other haptic applications. And, the "best" settings are targeted to each individual user, not the entire population.

While the DCC client collects information and communicates with server 210, the examples discussed also require haptic enabled device 220 to receive configuration setting information, which was sent to server 210 using the DCC client from haptic enabled devices 240. To accomplish the receiving of information, haptic enabled device 220 uses a configuration client. The configuration client, as shown in FIG. 1, resides on haptic enabled device 220 and requests information from server 210. In an embodiment, the configuration client communicates some information to server 210, e.g., an application identifier and/or user identifier. Alternatively, the configuration client could communicate all information about prior haptic setting used in haptic enabled device 220 by the user without providing a user identifier. Server 210 would then respond with the suggested haptic configuration setting and the application would adjust the initial settings accordingly, producing a preferred set of haptic effects on an haptic output device such as haptic enabled device 220.

Figure 3:
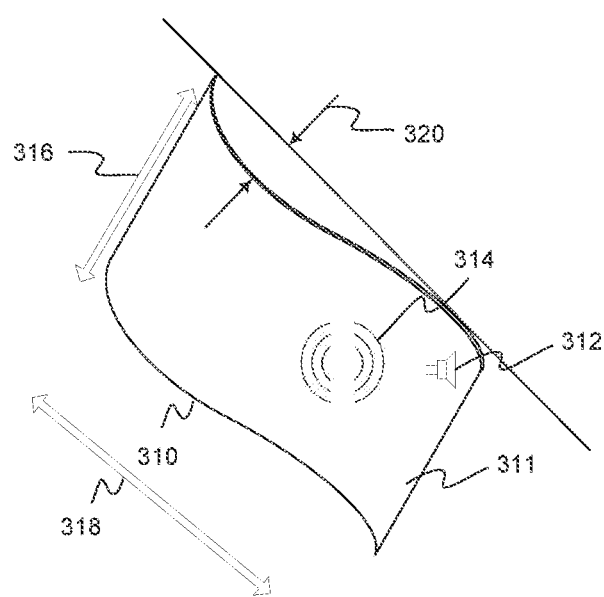
FIG. 3 illustrates some possible haptic effects that are controlled by haptic configuration settings, according to an embodiment.

FIG. 3 is an illustration of device 300 with various forms of haptic effects that would be controllable by haptic configuration settings, in accordance with an embodiment of the present invention. System 300 includes haptic enabled device 310. Haptic enabled device 310 includes a speaker 312. Haptic enabled device 310 can also contain multiple actuators (not shown) to produce a wide range of deformations and vibrations. Haptic enabled device 310 can also include a deformable outer shell 311 that is deformed by actuators (not shown). Deformation can be along any axis as shown by arrows 316 and 318, and can also bend as shown by displacement 320. Haptic enabled device 310 is also capable of multiple types of vibrations as shown by vibration symbol 314.

Haptic configuration settings can be used to control the audio and physical aspects of haptic enabled device 310. Configuration settings can include, but are not limited to choices such as on/off, haptic strength (light, medium, strong), haptic pervasiveness, frequency and sound volume.

Figure 4:
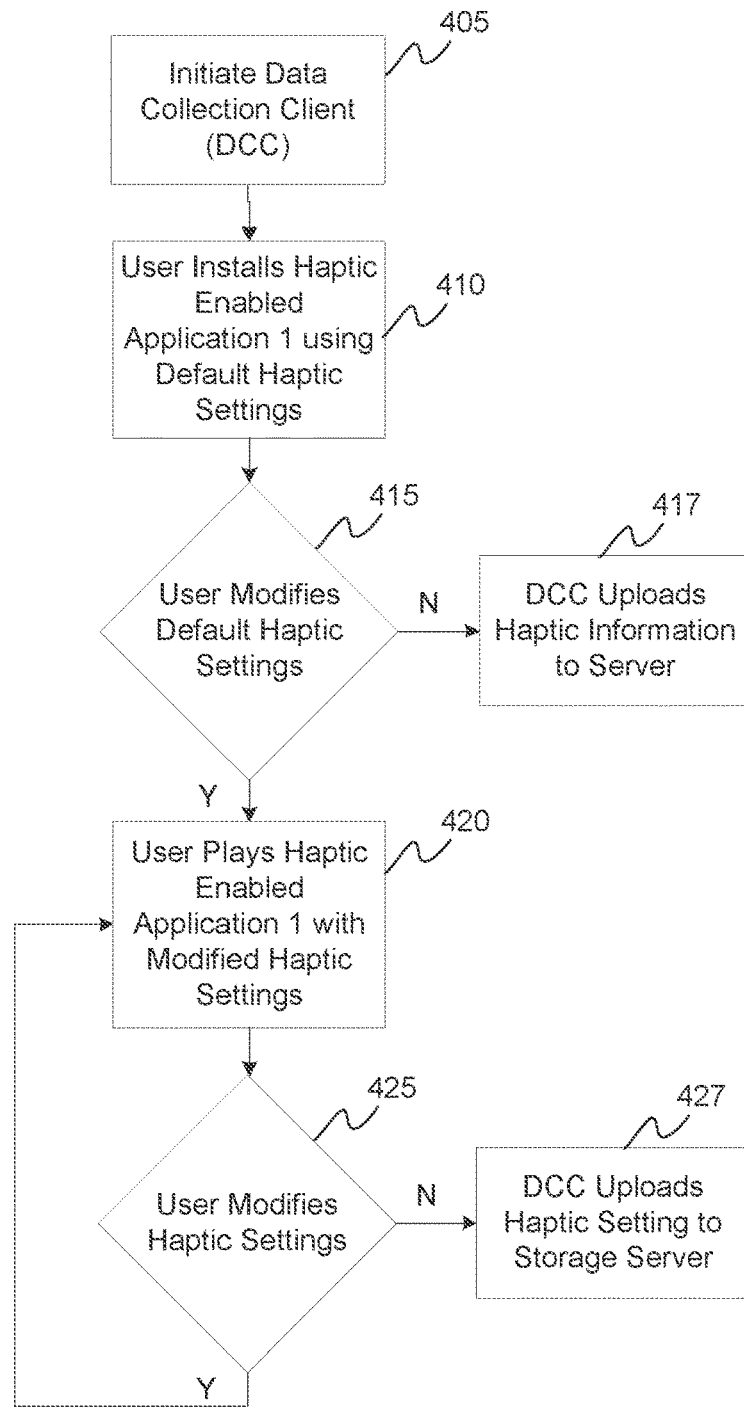
FIG. 4 is a method flow diagram illustrating the use of a data collection client to upload initial and modified haptic configuration settings to a server, according to an embodiment.

FIG. 4 is a flow diagram illustrating method 400 for collecting data from client haptic enabled devices, according to an embodiment. Method 400 starts with event 405, the initialization of a data collection client ("DCC") in a haptic enabled device such as haptic enabled device 240. In event 410, when a user installs a haptic enabled application, e.g., a game or video, the DCC will determine if the user has elected to maintain the default haptic settings. The user has the option to modify the default haptic settings, as shown in event 415. If the user decides not to modify the default settings, that information, in event 417, is communicated to a server, such as server 210.

The user may decide to modify the default settings, as shown in event 420. If the user is satisfied with the modified settings the DCC will then communicate the modified configuration settings to server 210 as shown in event 427. However, if the user again decides to modify the configuration setting, as shown in event 425, then the DCC will again contact server 210 with the modified settings.

Figure 5:
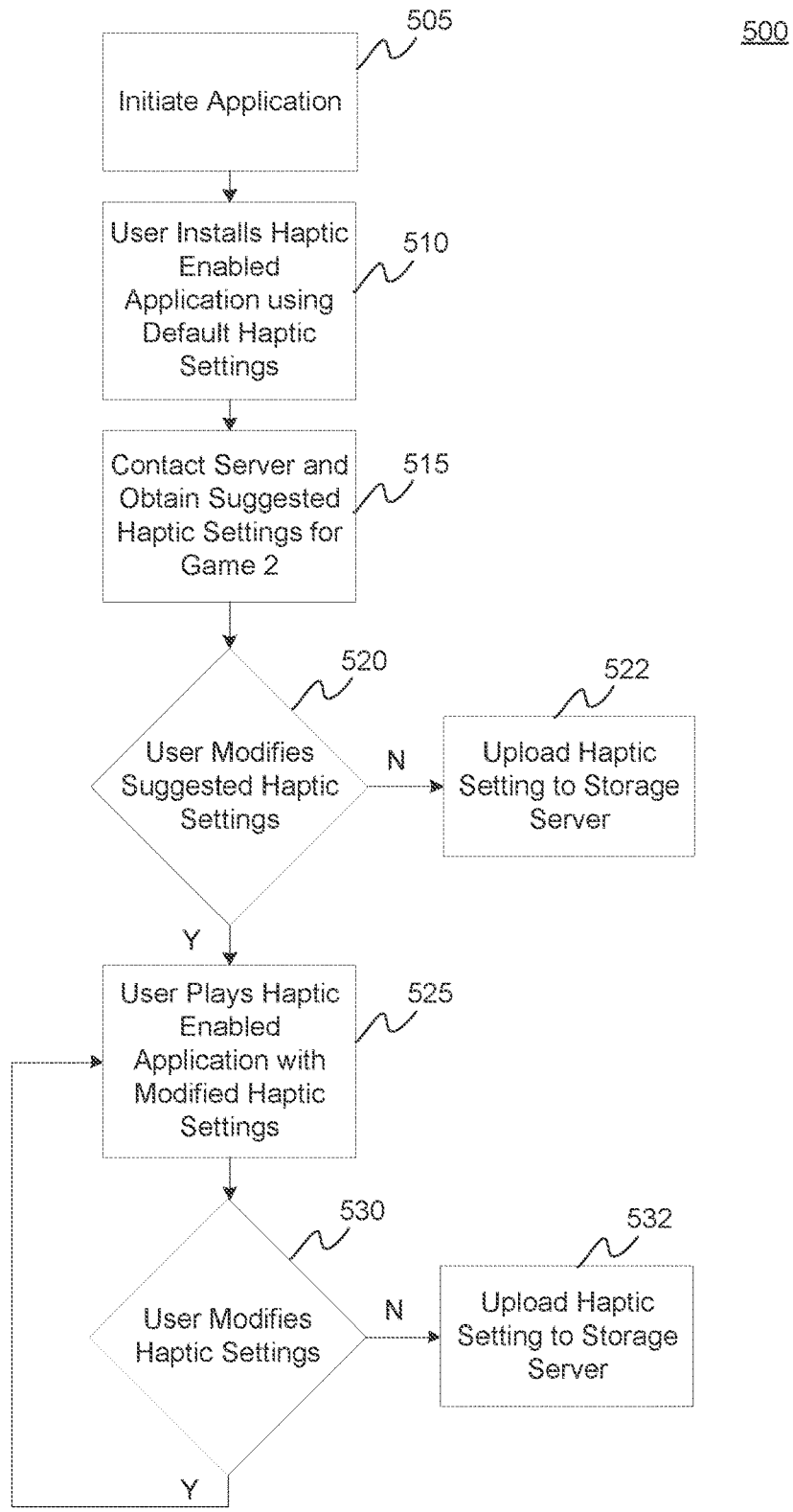
FIG. 5 is a method flow diagram illustrating obtaining haptic configuration settings from users that have played the same game or video, according to an embodiment.

FIG. 5 is a flow diagram illustrating method 500 for collecting data from one client haptic enabled device and applying those setting to another haptic enabled device, according to an embodiment. Method 500 starts with event 505 where a user installs and initiates an application program (e.g., a game or video). In event 510 the user initially accepts the default haptic settings associated with the application. In event 515, the DCC as discussed in FIG. 4, initiates communications with server 210 to obtain suggested haptic settings for the application. The suggested haptic settings are based on the settings of other users that have played the application and uploaded that information to server 210. The suggested settings that are transmitted to the user in event 515 can be an average of all of the obtained settings, or could be the output of an algorithm such as a time weighted average or other function.

In event 520 the user has received the suggested haptic settings and decides whether to maintain the suggested haptic settings, or to further modify the suggested settings. If the user is satisfied with the suggested settings then that satisfaction is communicated back to server 210 in event 522. In that situation server 210 would update its database showing that the suggested settings for this user with the game have been accepted.

However, the user may decide to modify the suggested haptic settings, as shown in event 525, and the user plays the game, or video, with the modified settings. If the user is satisfied with the modified settings, event 530, then such information is communicated back to server 210 in event 532. The modified setting can be communicated back to server 210 either as a group of settings, or individually as each setting is modified. Server 210 would then update its database of haptic settings for this particular game or video. Thus, when the database is accessed for a future suggestion of preferred settings, the preferred settings would reflect the updated information. If the user decides to further modify the settings the process is repeated in events 525 and 530. Any changes made by the user to the haptic configuration settings are communicated back to server 210 in event 532.

Figure 6:
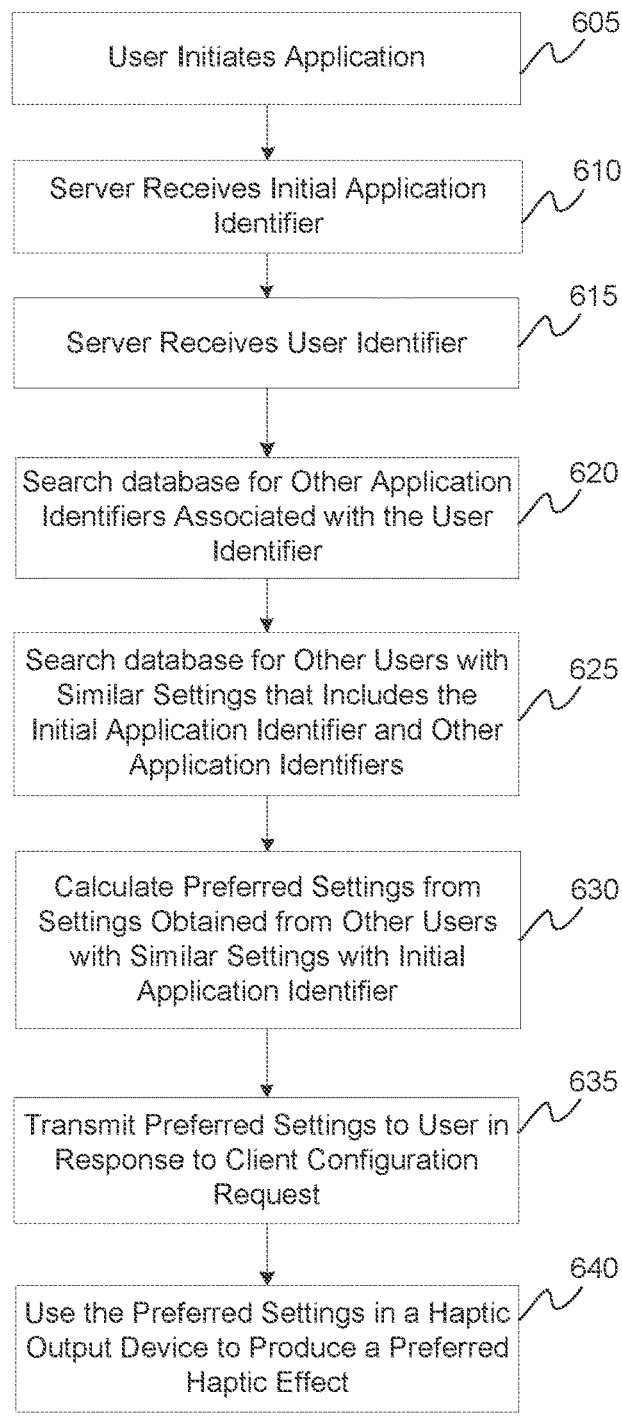
FIG. 6 is a method flow diagram illustrating obtaining haptic configuration settings based on the user's preferences and settings used by other users, according to an embodiment.

FIG. 6 is a flow diagram illustrating method 600 for collecting data from one client haptic enabled device and applying those setting to another haptic enabled device, according to an embodiment. Method 600 starts with event 605 where a user installs a new haptic enabled software application. The application has a set of default haptic configuration settings, but the DCC client software generates a communication to server 210 to start a process of requesting suggested haptic settings for the application.

In event 610, server 210 receives a communication from the DCC client on the haptic enabled device. The communication includes an application identifier that identifies which application is running, for example Angry Birds. Each application is assigned a unique identifier so that server 210 can identify the proper application. In event 615, server 210 receives a user identifier that identifies the particular user. The user identifier can optionally be tied to a specific device rather than a particular user. In addition, the user identifier can contain demographic information concerning the user or any other information to help identify the user's preferences. The user identifier can be a simple numeric identifier, e.g., User505.

In event 620, after server 210 has received the application identifier and the user identifier, server 210 searches a database to identify any other applications that the user, e.g., User505, has registered in the database. In an example, server 210 finds that User505 has played Fruit Ninja and Alto, where in those games the DCC had previously uploaded corresponding haptic configuration settings to server 210.

As previously discussed, a user with haptic preferences in one application will probably have similar preferences for a new application's settings. However, to get a better estimation of the desired settings for the new application, possibly because the new application has new configuration settings not present in the other applications, method 600 looks to other users with similar preferences, e.g., same intensity level, same pervasive level. In event 625, server 210 searches the database to identify other users with similar preferences. In addition, the search identifies individuals who have played the same application as the user, in this example, Fruit Ninja and Alto, and who have also played Angry Birds—the new application being installed by the user. Therefore, the haptic settings for Angry Bird chosen by others with similar preferences are an excellent starting point for our new user with the Angry Birds application.

In an embodiment, changes from default haptic settings will be given greater weight and consideration than default settings as changes from the default settings indicate that a user has made an effort to institute a change, rather than just accepting a default value. Therefore, in identifying other users with similar settings, the algorithms would consider that two users are more "similar" if they share changes in settings that if they share default settings. For example, assume a game or video contains three settings that default to {5, 50%, STRONG}, and that three users A, B and C have settings {5, 50%, WEAK}, {5, 50% STRONG} and {1, 50%, WEAK}. User A has two settings in common with B, and two settings in common with C. However, when analyzing the changed settings, user A has zero changes in common with B, and one change in common with C. Users A and C should therefore be considered more similar than A and B. Thus, in an embodiment, the analysis of changed settings takes priority over the use of default settings.

In an embodiment, similar users can be based on collected demographic information. Previously the data collection client was described as client software that collected information about the haptic configuration of an application. Such a client piece of software could also be configured to collect demographic information, such as age and gender, the size of the finger pads (which can be determined by touchscreens), and the amount of pressure that the user typically applies on a screen (which can be determined by force sensors). "Similar" users could be determined based solely on this demographic information or in combination with similar haptic configuration settings as previously discussed.

Haptic settings between different haptic-enabled applications can be related. Such settings can include the following:
Haptics On/Off;
Haptic Strength (light, medium, strong);
Haptic Pervasiveness;
Haptic Themes (subtle, intense, sharp, etc.);
Preferred Haptic Actuator (LRA, ERM, multi-actuator devices, etc.);
Preferred Frequency (HD devices); and
Preferred Info Encoding (length, frequency, repetition, etc.).

In event 630, server 210—or haptic enabled device 220—calculates a preferred set of haptic settings for Angry Bird. The preferred set of haptic settings could be an average of the settings chosen by the individuals identified in event 625, or it could be a median of those settings, or any other mathematical algorithm, e.g., weighted average, moving average, etc.

In an embodiment, the algorithm to calculate the preferred settings can depend on what information is known about the user. For example, if no information about the user is known, but it is known that the user is currently using "Game A." Based on that knowledge the algorithm would collect all the recorded data for each haptic setting in Game A, e.g., the intensity and theme. If the data for a setting is an interval or ratio, then the median or average value is calculated. For example, if five users have set the intensity to 15%, 70%, 70%, 70% and 100%, the preferred setting value would be 70% based on the median. If the data for a setting is nominal or ordinal, the preferred value would be that which is most often selected. For example, if five users have selected the themes "subtle," "intense," "intense," "sharp" and "off," then the "intense" theme would be the preferred setting. The same analysis would be performed for all the haptic settings.

If some additional information is known about the user, for example in addition to knowing the user is using Game A, the identity of the user is also known, e.g., User 1. In this scenario information about the other applications or videos used by the known user is collected. For example, assume it is known that User 1 has played Game B and Game C. Then, the algorithm searches for all users that have used Game A and at least Game B or Game C. For this example, assume that three such users were found that matched these criteria, e.g., Users 2, 3 and 4. For each user a similarity score is then computed. For example, assume User 2 has played Game A and Game B. The setting used by User 1 and User 2 are compared to determine a similarity score. If the value of the setting is numerical (interval or ratio), then the percentage difference between the two scores is computed. If the setting value is ordinal or nominal, a similarity score of 100% is assigned for the same selection and 0% for a different selection. The system could also include a similarity matrix entered by the developer, e.g. indicating a similarity of 50% between SUBTLE and OFF, and 0% between INTENSE and OFF. All such scores for one user could be averaged (e.g., across a shared application and the different settings for each application).

A similarity score for each user with the shared application would then be known. This score can be used to weigh the contribution of each user's settings in the shared application, e.g., Game A in the above example, to compute the preferred settings. The preferred settings could be found by using a weighted sum in the case of the numerical data and the most frequent setting would be used in the case of ordinal or nominal data.

Then, in event 635, the preferred set of haptic settings for the new application, e.g., Angry Birds, is sent to haptic enabled device 220. And, in event 640 the preferred set of haptic settings is used by a haptic output device, e.g., haptic enabled device 220, to produce a preferred haptic effect.

In another embodiment, method 600 can exclude the use of user identification. There are two options for method 600 if user identification is not used. Method 600 discussed above used the user identifier to allow server 210 to search for other applications and the associated haptic configuration settings that had been previously uploaded to server 210 by the user. In a modified version of method 600, the user could simply upload the application identifiers and associated haptic configuration settings that would allow server 210 to search the database for other users with similar settings. The balance of method 600 would proceed in the same manner.

The second option for a modified method 600 would be to forego attempting to find other users with "similar" haptic configuration settings. In that case the method would consist of event 605 where the user initiates the application, event 610 where server 210 receives the application identifier and then slight modifications of events 625 and 630, before transmitting the preferred settings to the user. Specifically, event 625 would search for other users that have played the new application, e.g., Angry Birds, and retrieve their configuration settings. And event 630 would calculate the preferred settings by taking the average, median, weighted average, etc., of the configuration settings obtained in event 625. The method would then conclude with the sending of those preferred haptic configuration settings to the user.

Embodiments shown in FIGS. 1-6, or any part(s) or function(s) thereof, may be implemented using hardware, software modules, firmware, tangible computer readable media having instructions stored thereon, or a combination thereof and may be implemented in one or more computer systems or other processing systems.

FIG. 7 illustrates an example computer system 700 in which embodiments, or portions thereof, may be implemented as computer-readable code. For example, the haptic enabled device shown in FIGS. 1-3, including modules for implementing the functions and methods shown in FIGS. 4, 5 and 6 can be implemented in computer system 700 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-6.

If programmable logic is used, such logic may execute on a commercially available processing platform or a special purpose device. For example, processor 120 of haptic enabled device 110 can be implemented using programmable logic. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 700. After reading this description, it will become apparent to a person skilled in the relevant art how to implement embodiments of the present invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged or performed concurrently without departing from the spirit of the disclosed subject matter.

Processor device 704 may be a special purpose or a general purpose processor device. As will be appreciated by persons skilled in the relevant art, processor device 704 may also be a single processor in a multi-core/multiprocessor system, such system operating alone, or in a cluster of computing devices operating in a cluster or server farm. Processor device 704 is connected to a communication infrastructure 706, for example, a bus, message queue, network, or multi-core message-passing scheme.

Computer system 700 also includes a main memory 708, for example, random access memory ("RAM"), and may also include a secondary memory 710. Secondary memory 710 may include, for example, a hard disk drive 712, removable storage drive 714. Removable storage drive 714 may comprise a floppy disk drive, a magnetic tape drive, an optical disk drive, a flash memory, or the like. The removable storage drive 714 reads from and/or writes to a removable storage unit 718 in a well-known manner. Removable storage unit 718 may comprise a floppy disk, magnetic tape, optical disk, etc. which is read by and written to by removable storage drive 714. As will be appreciated by persons skilled in the relevant art, removable storage unit 718 includes a computer usable storage medium having stored therein computer software and/or data.

Computer system 700 (optionally) includes a display interface 702 (which can include input and output devices such as keyboards, mice, etc.) that forwards graphics, text, and other data from communication infrastructure 706 (or from a frame buffer not shown) for display on display unit 730.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 may be in the form of signals, which may be electronic, electromagnetic, optical, or other signals capable of being received by communications interface 724. These signals may be provided to communications interface 724 via a communications path 726. Communications path 726 carries signals and may be implemented using wire or cable, fiber optics, a phone line, a cellular phone link, an RF link or other communications channels.

In this document, the terms "computer program medium" and "computer readable medium" are used to generally refer to storage media such as removable storage unit 718, removable storage unit 722, and a hard disk installed in hard disk drive 712. Computer program medium and computer readable medium may also refer to memories, such as main memory 708 and secondary memory 710, which may be memory semiconductors (e.g. DRAMs, etc.).

Computer programs (also called computer control logic) are stored in main memory 708 and/or secondary memory 710. Computer programs may also be received via communications interface 724. Such computer programs, when executed, enable computer system 700 to implement embodiments as discussed herein. In particular, the computer programs, when executed, enable processor device 704 to implement the processes of embodiments of the present invention. Accordingly, such computer programs represent controllers of the computer system 700. Where embodiments are implemented using software, the software may be stored in a computer program product and loaded into computer system 700 using removable storage drive 714, interface 720, and hard disk drive 712, or communications interface 724.

As disclosed above, a user has a haptic enabled device that uses a processor to execute a haptic enabled application program (e.g., computer game or video). The processor also executes a data collection client that identifies the application program and the user and communicates that information to a server. The haptic enabled device then receives from the server a preferred set of haptic settings which were calculated based on the settings of other users who have used the same application program and also other application programs used by the user. The default haptic setting associated with the computer game or video are then adjusted to use the preferred settings.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A method performed by a computing device for automatically generating a recommended haptic setting, wherein the recommended haptic setting is a value of a haptic parameter used to generate a haptic effect, the method comprising:

receiving, from a haptic enabled device, a first application identifier that identifies a first haptic enabled software application installed or being executed on the haptic enabled device;

identifying, from a database stored on or in communication with the computing device, a plurality of haptic settings associated with the first application identifier, wherein the plurality of haptic settings are a plurality of respective values of the haptic parameter;

determining the recommended haptic setting based on a mean, median, or most frequent setting of the plurality of haptic settings associated with the first application identifier in the database; and transmitting the recommended haptic setting to the haptic enabled device to cause the haptic enabled device to generate the haptic effect for the first haptic enabled software application based on the recommended haptic setting.

2. The method of claim 1, wherein the haptic parameter is at least one of a strength, a frequency, or a duration of the haptic effect, such that the plurality of haptic settings are respective values from the database for the strength, frequency, or duration of the haptic effect.

3. The method of claim 2, wherein the recommended haptic setting is a weighted average of the respective values from the database for the strength, frequency, or duration of the haptic effect.

4. The method of claim 1, wherein the haptic parameter is an identity or type of a haptic output device used to generate the haptic effect, such that the plurality of haptic settings are a plurality of respective values from the database for the identity or type of haptic output device used to generate the haptic effect, and wherein the recommended haptic setting is a most frequent value of the respective values from the database.

5. The method of claim 1, wherein the haptic enabled device is associated with a first user identifier, and wherein the plurality of haptic settings identified from the database are associated with a plurality of respective user identifiers different than the first user identifier.

6. The method of claim 5, wherein the database is maintained on the computing device and associates each application identifier of a plurality of application identifiers with a respective set of haptic settings, the respective set of haptic settings being further associated with different respective user identifiers in the database.

7. The method of claim 5, wherein the plurality of respective user identifiers associated with the plurality of haptic settings are a subset of all user identifiers associated with the first application identifier in the database, wherein the method further comprises selecting the plurality of user identifiers from among all user identifiers associated with the first application identifier in the database by:

identifying a second application identifier associated with the first user identifier in the database;

identifying a haptic setting associated with the first user identifier and with the second application identifier in the database;

identifying all user identifiers that are associated with both the second application identifier and the first user identifier in the database;

identifying, from among all user identifiers that are associated with both the second application identifier and the first application identifier, a subset of user identifiers having associated haptic settings for the second application identifier that are substantially the same as the haptic setting associated with the first user identifier and the second application identifier, wherein the plurality of user identifiers that are selected is the subset of user identifiers.

8. The method of claim 7, wherein the step of identifying the subset of user identifiers is further based on similarity between demographic information for the first user identifier and demographic information for the subset of user identifiers.

9. The method of claim 1, further comprising determining a default haptic setting associated with the first application identifier, wherein the determining of the recommended haptic setting is further based on the default haptic setting associated with the first application identifier.

10. The method of claim 1, wherein the computing device is a server configured to communicate with the haptic enabled device over a network.

11. The method of claim 10, further comprising receiving, from a data collection client executing on the haptic enabled device, information about haptic settings being used by the haptic enabled device.

12. A method performed by a computing device for automatically generating a recommended haptic setting, wherein the recommended haptic setting is a value of a haptic parameter used to generate a haptic effect, the method comprising:

receiving, from a haptic enabled device, a first application identifier that identifies a first haptic enabled software application installed or being executed on the haptic enabled device, wherein the haptic enabled device is associated with a first user identifier;

identifying, from a database stored on or in communication with the computing device, a second application identifier associated with the first user identifier;

identifying a haptic setting associated with the first user identifier and the second application identifier in the database;

identifying all user identifiers that are associated with both the second application identifier and the first user identifier in the database;

identifying, from among all user identifiers that are associated with the second application identifier and the first application identifier, a subset of user identifiers having associated haptic settings for the second application identifier that are substantially the same as the haptic setting associated with the first user identifier and the second application identifier;

identifying, from the database, a plurality of haptic settings that are associated with the subset of user identifiers and with the first application identifier, wherein the plurality of haptic settings are a plurality of respective values of the haptic parameter;

determining a recommended haptic setting based on the plurality of haptic settings; and transmitting the recommended haptic setting to the haptic enabled device to cause the haptic enabled device to generate the haptic effect for the first haptic enabled software application based on the recommended haptic setting.

13. The method of claim 12, further comprising:

identifying, from the database, a first piece of demographic information of the first user identifier;

identifying, from the database, additional pieces of demographic information of user identifiers that are associated with the first application identifier and the second application identifier, wherein the step of identifying the subset of user identifiers is further based on the first piece of demographic information of the first user identifier and on the additional pieces of demographic information of the user identifiers associated with the first application identifier and the second application identifier.

14. The method of claim 13, wherein the subset of user identifiers have associated demographic information in the database that is substantially the same as the demographic information associated with the first user identifier.

15. The method of claim 14, further comprising: wherein the demographic information of the first user identifier and the demographic information of the user identifiers associated with the first application identifier and the second application identifier indicate an amount of pressure respective users identified by the first user identifier and the user identifiers apply on their haptic enabled devices.

16. The method of claim 12, wherein the recommended haptic setting is determined as a mean, median, or most frequent setting of the plurality of haptic settings.

17. The method of claim 16, wherein the haptic parameter is at least one of a strength, a frequency, or a duration of the haptic effect, such that the plurality of haptic settings are values of the strength, frequency, or duration of the haptic effect, and wherein the recommended haptic setting is a weighted average of the values of the strength, frequency, or duration of the haptic effect.

18. A server comprising:
a communication interface configured to receive, from a haptic enabled device, a first application identifier that identifies a first haptic enabled software application installed on or being executed on the haptic enabled device;
a processor;
a non-transitory computer-readable medium having instructions stored thereon that, when executed by the processor, causes the processor
to identify, from a database stored on or in communication with the server, a plurality of haptic settings associated with the first application identifier, wherein the plurality of haptic settings are a plurality of respective values of a haptic parameter used to generate a haptic effect;
to determine a recommended haptic setting based on a mean, median, or most frequent setting of the plurality of haptic settings associated with the first application identifier in the database, wherein the recommended haptic setting is a value of the haptic parameter; and
to transmit the recommended haptic setting to the haptic enabled device to cause the haptic enabled device to generate the haptic effect for the first haptic enabled software application based on the recommended haptic setting.

19. The server of claim 18, wherein the communication interface is further configured to receive, from a data collection client executing on the haptic enabled device, information about haptic settings being used by the haptic enabled device.

20. The server of claim 18, wherein the communication interface is a network interface for communicating with the haptic enabled device over a network.

* * * * *